(No Model.)

W. C. KRICK.
FLORAL LETTER OR DESIGN.

No. 408,416. Patented Aug. 6, 1889.

WITNESSES:
S. T. Streeter
Robert J. Krick Jr.

INVENTOR
W. C. Krick
BY J. S. McTichau
ATTORNEY

UNITED STATES PATENT OFFICE.

WILLIAM C. KRICK, OF BROOKLYN, NEW YORK.

FLORAL LETTER OR DESIGN.

SPECIFICATION forming part of Letters Patent No. 408,416, dated August 6, 1889.

Application filed March 1, 1886. Serial No. 193,634. (No model.)

*To all whom it may concern:*

Be it known that I, WILLIAM C. KRICK, of Brooklyn, county of Kings, and State of New York, have invented a new and useful Improvement in Floral Letters or Designs, of which the following is a specification.

This invention relates to floral letters and designs for marking and ornamenting large floral pieces.

It has for its object to provide a letter or ornament made of small flowers wired or glued to a wooden foundation-piece, which is adapted to be held in position by means of tooth-picks inserted in its back, all as will be hereinafter explained.

In marking or forming designs on floral pieces it has been the custom heretofore to tie the flower to the end of a tooth-pick and stick the tooth-pick into the floral piece, and repeating the same process until the design, letter, or figure is complete. In practice I have found this to be a very tedious and slow process, first, because it takes a great deal of time to tie each flower singly to the pick, and, second, because the design, letter, or figure is very apt to be made crooked when each flower is applied to the piece singly.

My invention is fully illustrated in the accompanying drawings, which form part of this specification, and in which similar letters of reference indicate corresponding parts.

Figure 1:
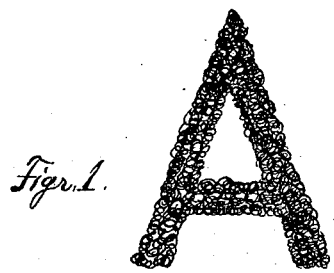
Figure 2:
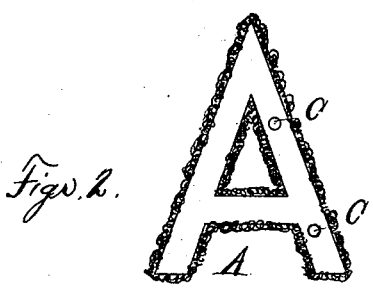
Figure 3:
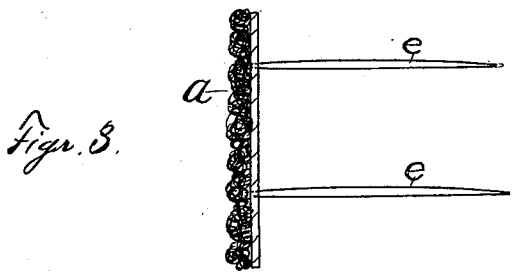

Figure 1 represents a face view of a letter made up of small flowers and ready to be applied to the floral piece. Fig. 2 represents a back view of the same, showing the foundation and form piece A provided with the two small holes $c\ c$, into which the end of the pick is inserted; and Fig. 3 represents a side elevation showing the manner in which the flowers $a$ are wired to the wooden foundation-piece A, and also the manner in which the tooth-picks are inserted to secure it to the floral piece.

To construct my improved floral letter or design, I first cut the foundation-piece A (of wood, metal, or stiff pasteboard) to requisite size and shape. The holes $c\ c$ are then made to receive the pick. I then secure the flowers by binding the stem portion to the form either with wire or fine twine. As each letter or design is secured with two or three picks, it can be accurately adjusted to the floral piece without disturbing the other flowers.

Having thus described my invention, what I claim, and desire to secure by Letters Patent, is, to wit:

A floral letter, figure, or design for decorating purposes, consisting of the flowers $a$, secured to the foundation-piece A, which is formed to create the letter or figure desired, and provided with the holes $c$, in combination with the picks $e$, all as herein described.

In testimony that I claim the foregoing improvement in floral letters and designs, as above described, I have hereunto set my hand this 9th day of June, 1885.

WILLIAM C. KRICK.

Witnesses:
E. A. PEEBLES,
R. J. KIRK, Jr.